US011940101B2

(12) United States Patent
Seitter

(10) Patent No.: US 11,940,101 B2
(45) Date of Patent: Mar. 26, 2024

(54) FUSIBLE LINK, GAS TANK, AND METHOD FOR ASSEMBLING A FUSIBLE LINK AND FOR INSTALLING SAME IN A GAS TANK

(71) Applicant: Robert Bosch GmbH, Stuttgart (DE)

(72) Inventor: Max Seitter, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 783 days.

(21) Appl. No.: 17/050,521

(22) PCT Filed: Apr. 15, 2019

(86) PCT No.: PCT/EP2019/059665
§ 371 (c)(1),
(2) Date: Oct. 26, 2020

(87) PCT Pub. No.: WO2019/206715
PCT Pub. Date: Oct. 31, 2019

(65) Prior Publication Data

US 2021/0190270 A1 Jun. 24, 2021

(30) Foreign Application Priority Data

Apr. 25, 2018 (DE) ..................... 10 2018 206 345.1

(51) Int. Cl.
*F17C 13/12* (2006.01)

(52) U.S. Cl.
CPC ...... *F17C 13/12* (2013.01); *F17C 2205/0317* (2013.01); *F17C 2209/22* (2013.01);
(Continued)

(58) Field of Classification Search
CPC .............. F17C 13/12; F17C 2205/0317; F17C 13/123; F17C 2209/22; F17C 2221/012;
(Continued)

(56) References Cited

U.S. PATENT DOCUMENTS 3,188,373 A 6/1965 Brunet et al.
3,417,768 A 12/1968 Wasson
(Continued)

FOREIGN PATENT DOCUMENTS

CA 2261392 A1 5/2000
CN 1064536 A 9/1992
(Continued)

OTHER PUBLICATIONS

International Search Report for Application No. PCT/EP2019/059665 dated Jul. 30, 2019 (English Translation, 2 pages).

*Primary Examiner* — Craig M Schneider
*Assistant Examiner* — Frederick D Soski
(74) *Attorney, Agent, or Firm* — Michael Best & Friedrich LLP

(57) ABSTRACT

The invention relates to a fusible link (100) for installation in a through-opening (4) in a gas tank (1000), having a tension rod (1), a guide sleeve (2) with at least one fluid-guiding duct (2*a*) for guiding gas out of the gas tank (1000) into the environment of the gas tank (1000), and a fusible sheath (3), wherein the guide sleeve (2) is formed in a ring around the tension rod (1) at least in some sections, and the fusible sheath (3) surrounds the guide sleeve (2) in a sheath-like manner at least in some sections, wherein the tension rod (10) has a tapered section (1*a*) which tapers in a direction away from the gas tank (1000) when installed in the gas tank (1000), the guide sleeve (2) has at least one predetermined breaking section (2*b*) which, when the fusible link (100) is installed into the through-opening (4), breaks to introduce fusible material (3*a*) into the at least one fluid-guiding duct (2*a*), as a result of which fused material (3*a*) from the fusible sheath (3) can pass into at least some sections of the at least one fluid-guiding duct (2*a*) to block a gas flow through the at least one fluid-guiding duct (2*a*), and the tension rod (1) and the guide sleeve (2) have a higher
(Continued)

strength and/or temperature resistance than the fused material (3*a*). The invention also relates to a method for assembling a fusible link (100) and for installing same in a gas tank (1000).

16 Claims, 2 Drawing Sheets

(52) U.S. Cl.
CPC .. *F17C 2221/012* (2013.01); *F17C 2260/042* (2013.01); *F17C 2270/0168* (2013.01); *F17C 2270/0184* (2013.01); *Y10T 137/1797* (2015.04); *Y10T 137/1812* (2015.04)

(58) Field of Classification Search
CPC ........ F17C 2260/042; F17C 2270/0168; F17C 2270/0184; Y10T 137/1797; Y10T 137/1812
See application file for complete search history.

(56) References Cited

U.S. PATENT DOCUMENTS

| | | | | | |
|---|---|---|---|---|---|
| 4,059,125 | A * | 11/1977 | Sugimura | F17B 1/14 | 137/493.2 |
| 4,147,272 | A * | 4/1979 | Stenner | F17C 13/123 | 137/72 |
| 4,404,983 | A * | 9/1983 | Scheurenbrand | B60K 15/01 | 220/88.1 |
| 4,690,295 | A * | 9/1987 | Wills | F17C 1/16 | 220/203.08 |
| 5,042,520 | A * | 8/1991 | Reznik | F17C 13/123 | 137/72 |
| 5,111,837 | A * | 5/1992 | Morris | F16K 17/383 | 137/72 |
| 6,142,346 | A * | 11/2000 | Aderholt | F17C 13/123 | 137/68.21 |
| 6,367,500 | B1 * | 4/2002 | Kerger | F16K 17/383 | 137/79 |
| 8,662,343 | B1 * | 3/2014 | Coors | F17C 1/00 | 220/586 |
| 2001/0018929 | A1 | 9/2001 | Taku | | |
| 2003/0041899 | A1 * | 3/2003 | Frank | F17C 13/04 | 137/74 |
| 2003/0221720 | A1 | 12/2003 | Girouard | | |
| 2005/0241693 | A1 * | 11/2005 | Delfino | F17C 13/123 | 137/79 |
| 2005/0252548 | A1 * | 11/2005 | Stetson | C01B 3/0047 | 137/72 |
| 2008/0173354 | A1 * | 7/2008 | Debray | F16K 99/0032 | 29/890.12 |
| 2009/0078706 | A1 * | 3/2009 | Ishitoya | F17C 13/04 | 220/562 |
| 2009/0293958 | A1 * | 12/2009 | Weatherly | F16K 17/383 | 137/79 |
| 2011/0056960 | A1 * | 3/2011 | Blanc | B29C 70/32 | 156/187 |
| 2011/0057138 | A1 * | 3/2011 | Maus | F16K 17/10 | 251/357 |
| 2011/0181385 | A1 * | 7/2011 | Schulze-Icking-Konert | H01H 37/761 | 337/290 |
| 2011/0253221 | A1 * | 10/2011 | Freiler | B65D 90/36 | 220/315 |
| 2012/0073681 | A1 * | 3/2012 | Balkus, Jr. | F17C 13/04 | 137/535 |
| 2012/0285956 | A1 * | 11/2012 | Kotefski | B65D 90/32 | 220/89.1 |
| 2013/0082054 | A1 | 4/2013 | Groben | | |
| 2013/0291754 | A1 * | 11/2013 | Kotefski | B65D 90/36 | 137/72 |
| 2014/0057146 | A1 * | 2/2014 | Kohlberger | H01M 50/569 | 429/90 |
| 2014/0261745 | A1 * | 9/2014 | Hayes | F17C 1/00 | 137/315.04 |
| 2015/0000546 | A1 * | 1/2015 | Kotefski | F42B 27/00 | 220/89.1 |
| 2015/0204483 | A1 * | 7/2015 | Kojima | F16C 1/16 | 220/592.25 |
| 2016/0033085 | A1 * | 2/2016 | Sirosh | F17C 13/12 | 137/2 |
| 2017/0038006 | A1 * | 2/2017 | Emori | F17C 1/16 | |
| 2017/0050160 | A1 * | 2/2017 | Yang | C01B 3/001 | |
| 2017/0144535 | A1 * | 5/2017 | Sonderegger | F17C 13/12 | |
| 2017/0307139 | A1 * | 10/2017 | Sinha | F17C 1/10 | |
| 2017/0343158 | A1 * | 11/2017 | Kato | F17C 1/06 | |
| 2018/0156387 | A1 * | 6/2018 | Maekawa | F17C 13/04 | |
| 2018/0172207 | A1 * | 6/2018 | Uehara | F17C 1/06 | |
| 2019/0186693 | A1 * | 6/2019 | Wilder | B21D 51/24 | |

FOREIGN PATENT DOCUMENTS

| | | | |
|---|---|---|---|
| CN | 104259429 | A | 1/2015 |
| CN | 204094110 | U | 1/2015 |
| CN | 105202227 | A | 12/2015 |
| CN | 105257883 | A | 1/2016 |
| CN | 105299464 | A | 2/2016 |
| DE | 3812552 | | 11/1989 |
| DE | 102010011878 | | 9/2011 |
| JP | 2008095731 | A | 4/2008 |
| JP | 2013076433 | A | 4/2013 |
| JP | 2016156474 | A | 9/2016 |
| JP | 2016183690 | A | 10/2016 |
| JP | 2017025935 | A | 2/2017 |

* cited by examiner

A - A

FUSIBLE LINK, GAS TANK, AND METHOD FOR ASSEMBLING A FUSIBLE LINK AND FOR INSTALLING SAME IN A GAS TANK

BACKGROUND OF THE INVENTION

The present invention relates to a fusible link for installation in a through opening of a gas tank. The invention moreover relates to a gas tank having a through opening for the emergency outlet of gas from the gas tank and a fusible link installed in the through opening. The invention furthermore relates to a method for assembling a fusible link and for installing the same in a through opening of a gas tank.

In order to be able to operate gas tanks such as high-pressure hydrogen tanks safely, safety measures must be taken for a variety of environmental factors. Thus, for example, a device is required for high-pressure hydrogen tanks for fuel cell vehicles which causes the hydrogen to be discharged in the event of fire before the hydrogen tank ruptures owing to overheating. Sudden combustion of a relatively large amount of hydrogen is thus prevented. So-called thermally activated shut-off devices are customary in gas supply technology but they cause precisely the opposite effect because they close instead of opening in the event of an elevated temperature. Another commercially available solution functions according to the principle of a sprinkler head of a fire extinguishing system in which a valve opens by virtue of thermally induced rupturing of a glass ampoule. When a temperature threshold value is exceeded, which corresponds to a fire, the hydrogen contained in the tank can escape under defined conditions before the hydrogen tank ruptures. The complex construction, the mechanical sensitivity, and the structural size are considered to be disadvantageous for this prior art.

A safety device for gas-pressurized tanks is moreover disclosed in DE 10 2010 011 878 A1 which has a connection apparatus, which can be attached to a pressure chamber of the tank, for forming a passage between a gas side of the tank and the outside of the tank, wherein a means which normally blocks the passage is moreover present which can be shifted under the influence of temperature into a state which enables a flow path through the passage to be opened up. The means blocking the passage can, according to DE 10 2010 011 878 A1, be solder consisting of an alloy which is selected such that the melting point is lower than the melting point of the surrounding tank wall, such that the solder can melt in the case of an elevated temperature and open up the passage in order to reduce the pressure in the tank. However, if the operating temperature in the tank approaches the melting point of the solder, the operational tensile or shear stresses in the solder can cause the hard solder to lose its sealing effect and/or fall out owing to the long-term plastic deformation or creep.

SUMMARY OF THE INVENTION

In order to take account of the abovedescribed problem, a fusible link, a gas tank, and a method for assembling and installing a fusible link in a through opening of a gas tank are described within the scope of the invention. Features and details which are described in connection with the fusible link here of course also apply in connection with the gas tank according to the invention, to the method according to the invention, and vice versa, such that reference is or can always be made reciprocally to the individual aspects of the invention with regard to the description.

According to a first aspect of the present invention, a fusible link for installation in a through opening of a gas tank is provided. The fusible link has a tension rod, a guide sleeve with at least one fluid guide duct for guiding gas out of the gas tank into the surroundings of the gas tank, and a fusible sheath. The guide sleeve is configured around the tension rod in an at least partially annular fashion. The fusible sheath encloses the guide sleeve at least partially in the manner of a sheath. The tension rod has a tapered section which, in a state in which it is installed in the gas tank, tapers away from the gas tank. The guide sleeve has at least one predetermined breaking section which breaks when the fusible link is installed in the through opening in order to introduce fusible material into the at least one fluid guide duct, as a result of which fusible material of the fusible sheath can penetrate at least partially into the at least one fluid guide duct for the purpose of blocking the flow of gas through the at least one fluid guide duct. The tension rod and the guide sleeve have a greater strength and/or temperature resistance than the fusible material or the fusible sheath.

By using the fusible link according to the invention, conventional fastening means such as, for example, screws can be dispensed with. The fusible link can be simply pushed into the through opening of the gas tank and be expanded therein by means of the tension rod. Because the tension rod expands, is pressed, or is pulled into the guide sleeve, the at least one predetermined breaking section can be broken and fusible material from the fusible sheath can penetrate into the at least one fluid guide duct and seal the latter. To be more precise, as a result the internal volume of the gas tank can be sealed with respect to the surroundings of the gas tank. Because conventional fastening means such as, for example, screws can be dispensed with, the fusible link can close the through opening particularly fluid-tightly. Furthermore, the proposed solution represents a relatively cost-effective system. The present fusible link is moreover particularly light in comparison with conventional fusible links.

The gas tank should be understood to preferably be a hydrogen tank, in particular a high-pressure hydrogen tank for fuel cell vehicles or similar applications. In other words, the fusible link is designed in particular for installation in a through opening of a hydrogen tank. The sealing effect is crucially important in the case of a hydrogen tank. As far as possible, fastening elements such as, for example, screws which penetrate through the outer surface of the hydrogen tank should be dispensed with. By means of the present invention, this can be ensured at least in the region of the through opening for the emergency discharge of gas from the hydrogen tank.

It is furthermore advantageous if at least some fusible material is already situated in at least one fluid guide duct before the fusible link is installed in the through opening. As a result, less fusible material from the fusible sheath needs to penetrate into the at least one fluid guide duct during the installation of the fusible link. Consequently, the sealing function for sealing the gas tank during the installation of the fusible link in the through opening can be achieved particularly simply and reliably. It is moreover possible that in each case at least some fusible material is introduced into multiple through openings.

The fusible link and/or the tension rod each preferably have a rotationally symmetrical or essentially rotationally symmetrical basic shape. As a result, the fusible link can be inserted particularly simply into the through opening. By virtue of a rotationally symmetrical or essentially rotationally symmetrical design of the tension rod, the latter can be placed in the guide sleeve correspondingly simply during the installation of the fusible link in the through opening. Inadvertent or deliberate false installation can as far as possible be prevented as a result of the rotationally symmetrical design.

Greater strength should be understood to mean in particular a greater breaking strength in the form of greater tensile strength, greater pressure resistance, greater compressive strength, greater bending strength, and/or greater shear resistance. In other words, the strength of the tension rod and/or the guide sleeve comprises a breaking strength which is correspondingly greater than and in particular at least twice as great as the fusible material or a partial section of the fusible link which has the fusible material.

Temperature resistance or heat resistance should be understood to mean the ability of the respective materials and/or components to withstand high temperatures. In the case of materials and/or components with a greater temperature resistance, the respective temperature-dependent properties change when acted on by a high temperature more slowly than in the case of materials and/or components with a lower temperature resistance.

A separation of strength and sealing effect can be achieved simply by virtue of the design of the fusible link. In contrast to conventional fusible links, relatively high tensile or shear stresses consequently do not occur in the fusible material which can cause such fusible links to lose their sealing effect or fall out owing to the long-term plastic deformation or creep. The fusible link can consequently be used for high pressures and/or operating temperatures which are close to a predefined threshold temperature value. When the predefined threshold temperature value is exceeded, the fusible material of the fusible sheath, and the fusible material situated in the at least one fluid guide duct, melts and thus opens up the path for the gas from the gas tank into the surroundings of the gas tank.

According to a further embodiment of the present invention, it is possible that in a fusible link the fusible material has a melting point between 100° C. and 160° C. or between 200° C. and 300° C. It was proved in comprehensive trials within the scope of the present invention that the fusible link can be operated particularly reliably with such fusible material.

In the case of a fusible link according to the invention, it is furthermore conceivable that the fusible material comprises at least substantially metal and in particular indium, tin, bismuth, and/or an alloy thereof. These materials have proved to be particularly suitable in trials within the scope of the present invention. The fusible material is preferably made completely of metal. It can be advantageous if the fusible material at least predominantly comprises a eutectic alloy, in particular indium/tin or bismuth/tin. It can moreover be advantageous if the fusible material comprises at least predominantly a congruently melting metal alloy, in particular indium/bismuth. Very surprisingly, it was proved in comprehensive trials within the scope of the present invention that the fusible material can also comprise plastic, and can even be made at least predominantly from plastic. When plastic is used, advantages in terms of weight and processing can be obtained.

In the case of a fusible link according to the present invention, it is moreover possible that, in a state when it is installed in the gas tank, it forms a sealing plug in the through opening of the gas tank. The fusible link accordingly preferably has the form of a plug or stopper for pressing into the through opening. The fusible link thus differs in particular from generic cap-like closing means. The plug or stopper form is conducive to particularly simple installation in the through opening of the gas tank.

It is moreover conceivable in the case of a fusible link according to the present invention that the tension rod and/or the guide sleeve are made from metal or substantially from metal. As a result, the tension rod and/or the guide sleeve can be provided relatively cost-effectively with the desired temperature resistance and/or strength. The tension rod and/or the guide sleeve can be made, for example, from steel.

It can moreover be provided in the case of a fusible link according to the invention that the tension rod, for installation of the fusible link in the through opening of the gas tank, is positioned in the guide sleeve so that it can be displaced relative to the guide sleeve non-destructively. This enables the abovedescribed simple installation of the fusible link in the through opening of the gas tank. The tension rod is positioned or mounted in the guide sleeve so that it can be displaced in particular without destroying or damaging the guide sleeve. Of course this relates in particular to a point in time at which the fusible link has not yet been installed in the through opening.

According to a further aspect of the present invention, a gas tank is provided with a through opening for the emergency discharge of gas from the gas tank. The gas tank has a fusible link, as described above, which is arranged in the through opening for a controlled discharge of gas from the gas tank. The gas tank according to the invention thus affords the same advantages as were described in detail with reference to the fusible link according to the invention. The gas tank is preferably designed in the form of a hydrogen tank, in particular in the form of a high-pressure hydrogen tank for a motor vehicle. The through opening of the gas tank has at least partially a tapered section which tapers in the direction from an internal volume of the gas tank toward the surroundings of the gas tank, and in particular tapers such that it corresponds to the tapered section of the tension rod. This too contributes to the desired separation, already described above, of strength and sealing effect. In the case of the present gas tank, the fusible link is arranged in the through opening by being pressed therein.

It is also conceivable in the present invention that the guide sleeve is pressed into the through opening at least partially in the region of the tapered section, sandwiched between the tension rod and the fusible sheath. This contributes to making the fusible link compact. As a result, a more space-saving and at the same time more secure seating of the guide sleeve between the tension rod and the fusible sheath can moreover be enabled.

It is furthermore possible that, in the case of a gas tank according to the invention, the maximum diameter of the tension rod is smaller than the internal diameter of the through opening. It is consequently possible that all the parts of the fusible link including the tension rod for installing the fusible link in the through opening can be guided from outside the gas tank or the internal volume of the gas tank, through the through opening, toward the internal volume of the gas tank. This makes it possible for the fusible link to be installed particularly simply in the gas tank or its through opening.

According to a further aspect of the present invention, a method is made available for assembling and installing a fusible link, as described above, in a through opening of the gas tank. The method comprises the following steps:

- providing the guide sleeve,
- sheathing the guide sleeve with the fusible sheath,
- introducing the tension rod at least partially into the guide sleeve, introducing the combined components consisting of the tension rod, the guide sleeve, and the fusible sheath into the through opening and, when the combined components are situated in the through opening, pressing the tension rod into the guide sleeve in order to break the at least one predetermined breaking section by displacing the tension rod in the direction in which the tapered section tapers.

The method according to the invention thus also affords the same advantages as were described in detail above. Within the scope of the method, all the components can be pushed through the through opening from outside the gas tank. This enables the fusible link to be installed particularly simply in the through opening of the gas tank. In order to install the fusible link in the through opening, first the guide sleeve can be encapsulated to form the fusible sheath with the fusible material, then the tension rod can be pushed through the guide sleeve, then these combined components can be positioned at least partially in the through opening, and then the tension rod can be tightened in order to press the fusible link into the through opening. An end of the tension rod which protrudes outside the gas tank can finally be cut off.

Further measures which improve the invention emerge from the following description of some exemplary embodiments of the invention which are shown schematically in the drawings. All the features and/or advantages which can be found in the claims, the description, and the drawings, including structural details and spatial arrangements, can be essential to the invention both per se and in different combinations.

DETAILED DESCRIPTION

Figure 1:
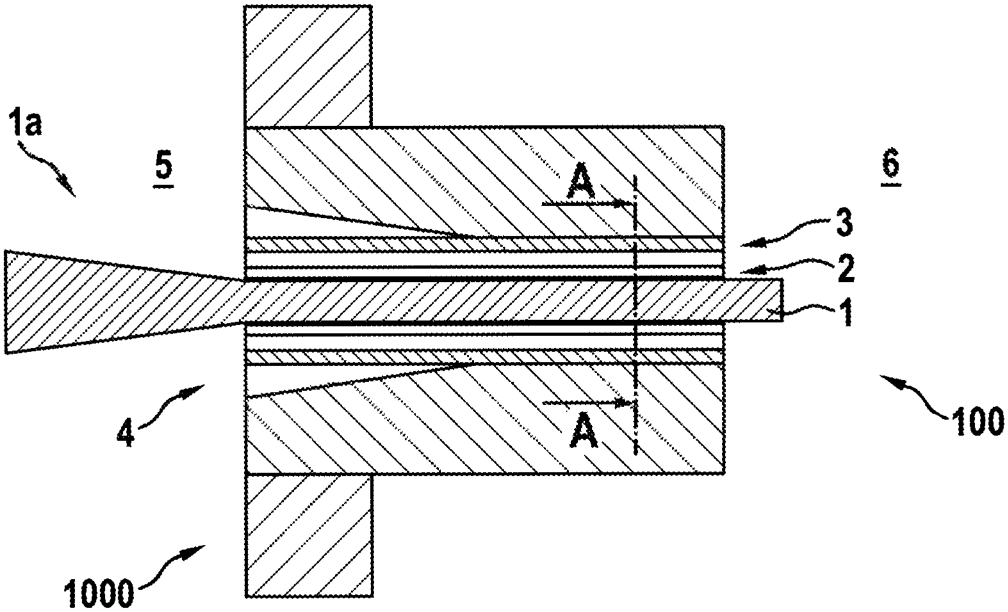
FIG. 1 shows a schematic view in section of a fusible link according to the invention in a first installed state.
Figure 2:
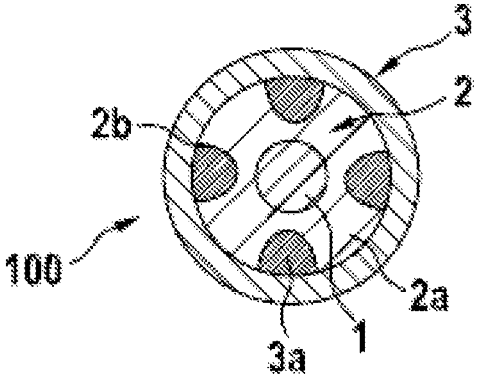
FIG. 2 shows a further view in section of the fusible link along line A-A in FIG. 1.
Figure 3:
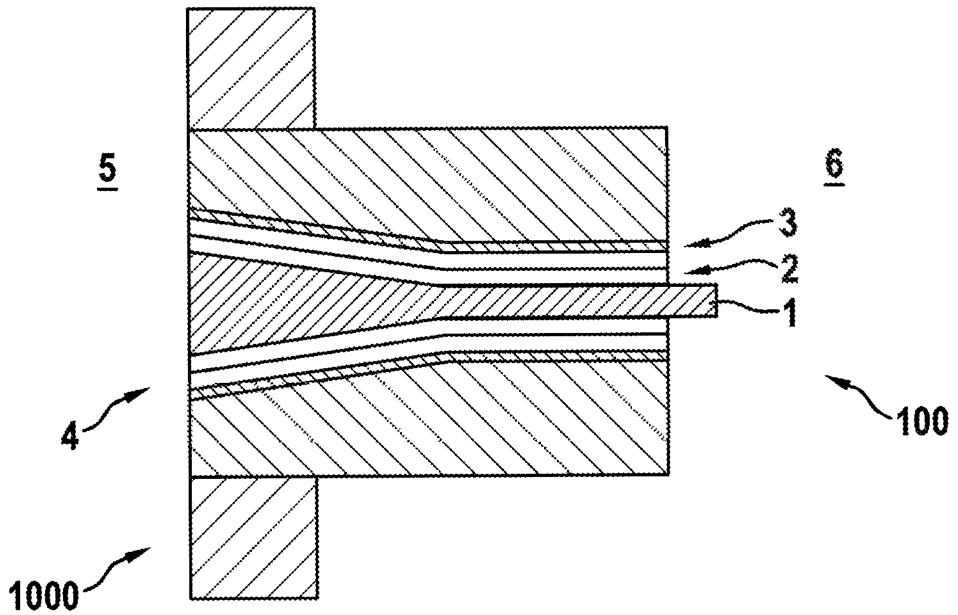
FIG. 3 shows a schematic view in section of the fusible link shown in FIG. 1 in a second installed state.

Elements with the same function and operating principle have in each case been provided with the same reference numerals in FIGS. 1 to 3.

A gas tank 1000 in the form of a high-pressure hydrogen tank with a through opening 4 for the emergency discharge of gas from the gas tank 1000 is shown schematically in FIG. 1. A fusible link 100 for the controlled discharge of gas from the gas tank 1000 is positioned in the through opening. The fusible link 100 forms according to FIG. 1 a sealing plug in the through opening 4 of the gas tank 1000.

The fusible link 100 has a tension rod 1, a guide sleeve 2 with multiple fluid guide ducts 2*a* for guiding gas from the gas tank 1000 into the surroundings of the gas tank 1000, and a fusible sheath 3. The guide sleeve 2 is configured annularly around the tension rod 1, and the fusible sheath 3 surrounds the guide sleeve in the manner of a sheath. The tension rod 1 has a tapered section 1*a* which tapers away from the gas tank 1000 and toward the surroundings 6 of the gas tank 1000. The guide sleeve 2 has a predetermined breaking section 2*b*, shown in particular in FIG. 2, which breaks when the fusible link 100 is installed in the through opening 4 in order to introduce fusible material 3*a* of the fusible sheath 3 into the fluid guide ducts 2*a*, as a result of which malted material 3*a* of the fusible sheath 3 can penetrate into the fluid guide ducts 2*a* in order to block the flow of gas through the fluid guide ducts 2*a*. The tension rod 1 and the guide sleeve 2 each have a greater strength and temperature resistance than the fusible material 3*a* or the component section of the fusible link 100 with the fusible material 3*a*.

The fusible material 3*a* essentially takes the form of an indium/tin compound with a melting point of approximately 120° C. The tension rod 1 and the guide sleeve 2 are each made from metal. As can be seen in FIG. 1, the tension rod 1, for installation of the fusible link 100 in the through opening 4 of the gas tank 1000, is positioned in the guide sleeve 2 so that it can be displaced relative to the guide 2 sleeve non-destructively. It is moreover shown in FIG. 1 that the guide sleeve 2 is pressed into the through opening 4 in the region of the tapered section 1*a*, sandwiched between the tension rod 1 and the fusible sheath 3. The maximum diameter of the tension rod 1 is smaller than the internal diameter of the through opening 4.

In the case of a gas tank 1000 shown in FIG. 3, forces which occur owing to the pressure of the gas in the gas tank 1000 can be transmitted in the region of the fusible link 1000 from the latter to the wall of the gas tank 1000. This results in the abovedescribed and desired separation of strength and sealing effect. Relatively high tensile or shear stresses in the fusible material, which could cause the fusible link to lose its sealing effect or to fall out owing to long-term plastic deformation, can consequently be prevented.

A method for assembling and installing the fusible link 1000 in the through opening 4 of the gas tank 1000 is now explained with reference to FIGS. 1 and 3. Within the scope of the method, the guide sleeve 2 is first provided. Then the fusible material 3*a* is applied to the guide sleeve 2 in order to produce the fusible sheath 3. The thin end of the tension rod 1 is then introduced into the guide sleeve 2. After this, the combined components consisting of the tension rod 1, the guide sleeve 2, and the fusible sheath 3, as shown in FIG. 1, is introduced into the through opening 4 from the surroundings 6 of the gas tank 1000 toward the internal volume 5 of the gas tank 1000. As soon as these combined components are situated in the through opening 4, the tension rod 1 is displaced or pulled toward the surroundings 6, or in the direction in which the tapered section 1*a* tapers, i.e. to the right in the drawings, and consequently pressed into the guide sleeve 2. As a result, the predetermined breaking sections 2*b* break and the fusible material 3*a* in the fusible sheath 3 and/or in the guide sleeve 2 can penetrate into the fluid guide ducts 2*a* such that the latter are closed fluid-tightly. In other words, by virtue of this step, the gas tank 1000 is sealed with respect to the surroundings 6 in the region of the through opening 4. A counter-pressure is hereby applied from outside, i.e. the surroundings 6, to the guide sleeve 2 and the fusible sheath 3 such that they remain positioned in the through opening 4 at the desired position. Finally, the protruding tip of the tension rod 1 can be cut off.

The invention permits further design principles in addition to the embodiments shown. The invention should therefore not be considered to be limited to the embodiments shown in the drawings.

What is claimed is:

1. A fusible link (100) for installation in a through opening (4) of a gas tank (1000), the fusible link (100) having a tension rod (1), a guide sleeve (2) with at least one fluid guide duct (2*a*) that guides gas out of the gas tank (1000) into the surroundings of the gas tank (1000), and a fusible sheath (3), wherein the guide sleeve (2) surrounds the tension rod (1) in an at least partially annular fashion and the fusible sheath (3) encloses the guide sleeve (2) at least partially, wherein the tension rod (1) has a tapered section (1*a*) that tapers away from the gas tank (1000), the guide sleeve (2) has at least one predetermined breaking section (2*b*) configured such that the at least one predetermined breaking section (2*b*) breaks when the fusible link (100) is installed in the through opening (4) such that fusible material (3*a*) is introduced into the at least one fluid guide duct (2*a*) and penetrates at least partially into the at least one fluid guide duct (2*a*) and blocks a flow of gas through the at least one fluid guide duct (2*a*), and the tension rod (1) and the guide sleeve (2) have a greater strength and/or temperature resistance than the fusible material (3*a*).

2. A gas tank (1000) comprising a through opening (4), and a fusible link (100) as claimed in claim 1, wherein the fusible link (100) is arranged in the through opening (4).

3. The gas tank as claimed in claim 2, wherein the guide sleeve (2) is pressed into the through opening (4) at least partially in a region of the tapered section (1*a*), sandwiched between the tension rod (1) and the fusible sheath (3).

4. The gas tank as claimed in claim 2, wherein a maximum diameter of the tension rod (1) is smaller than an internal diameter of the through opening (4).

5. The fusible link (100) as claimed in claim 1, wherein the guide sleeve (2) is made from metal.

6. The fusible link (100) as claimed in claim 5, wherein the tension rod (1) is made from metal.

7. The fusible link (100) as claimed in claim 1, wherein the fusible material (3*a*) has a melting point between 100° C. and 160° C.

8. The fusible link (100) as claimed in claim 1, wherein the fusible material (3*a*) comprises metal.

9. The fusible link (100) as claimed in claim 1, wherein, in a state when the fusible link (100) is installed in the gas tank (1000), the fusible link (100) forms a sealing plug in the through opening (4) of the gas tank (1000).

10. The fusible link (100) as claimed in claim 1, wherein the tension rod (1) and/or the guide sleeve (2) are made from metal.

11. The fusible link (100) as claimed in claim 1, wherein the tension rod (1), for installation of the fusible link (100) in the through opening (4) of the gas tank (1000), is positioned in the guide sleeve (2) and is configured such that the tension rod (1) is displaced relative to the guide sleeve (2) non-destructively.

12. A method for assembling the fusible link (100) as claimed in claim 1 and installing the fusible link (100) in the through opening (4) of the gas tank (1000), the method having the steps:

providing the guide sleeve (2), sheathing the guide sleeve (2) with the fusible sheath (3), introducing the tension rod (1) at least partially into the guide sleeve (2), introducing combined components including the tension rod (1), the guide sleeve (2), and the fusible sheath (3) into the through opening (4) and, when the combined components are situated in the through opening (4), pressing the tension rod into the guide sleeve (2) in order to break the at least one predetermined breaking section (2*b*) by displacing the tension rod (1) in a direction in which the tapered section (1*a*) tapers.

13. The fusible link (100) as claimed in claim 1, wherein the fusible material (3*a*) has a melting point between 200° C. and 300° C.

14. The fusible link (100) as claimed in claim 1, wherein the fusible material (3*a*) comprises indium, tin, bismuth, and/or an alloy thereof.

15. The fusible link (100) as claimed in claim 1, wherein the tension rod (1) is made from metal.

16. The fusible link (100) as claimed in claim 1, wherein the tension rod (1) and the guide sleeve (2) are made from metal.

* * * * *